United States Patent
Lin

(10) Patent No.: US 7,218,786 B2
(45) Date of Patent: May 15, 2007

(54) METHOD OF COMPRESSING AND DECOMPRESSING IMAGES

(75) Inventor: Che-Sheng Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 763 days.

(21) Appl. No.: 10/452,720

(22) Filed: Jun. 3, 2003

(65) Prior Publication Data
US 2004/0247184 A1 Dec. 9, 2004

(51) Int. Cl.
*G06K 9/36* (2006.01)
*G06K 9/46* (2006.01)

(52) U.S. Cl. .................. 382/233; 382/247; 382/303

(58) Field of Classification Search .......... 382/233, 382/234, 244, 247, 303, 304; 358/426.13
See application file for complete search history.

(56) References Cited

U.S. PATENT DOCUMENTS 5,809,176 A * 9/1998 Yajima ................ 382/247
6,882,751 B2 * 4/2005 Kambegawa ........... 382/247

* cited by examiner

*Primary Examiner*—Phuoc Tran
(74) *Attorney, Agent, or Firm*—Rabin & Berdo, P.C.

(57) ABSTRACT

A method of compressing and decompressing images is disclosed for applications in compression and decompression chips with the JBIG standard. The pipeline of computing a pixel is divided into three parts: memory access, numerical operations, renormalization and byteout/bytein. Each steps takes a work cycle; therefore, three pixels are processed in parallel at the same time. In comparison, the work cycle of the prior art without pipeline improvement is longer. This method can effectively shorten the work cycle of each image data process, increasing the speed of compressing and decompressing image data.

4 Claims, 5 Drawing Sheets

METHOD OF COMPRESSING AND DECOMPRESSING IMAGES

BACKGROUND OF THE INVENTION

1. Field of Invention

The invention relates to a method of image compression and decompression and, in particular, to a method of image compression and decompression in a compression and decompression chip with the JBIG standard.

2. Related Art

After sampling and digitization, an original picture will have a very large size of data. Such a large data size is very inconvenient in image processing, storage and transmissions. The image compression technique is to represent the same picture using less data, reducing the data transmission time.

The basic idea in image compression is to remove redundant data from the picture. The data redundancies in pictures have the following sources:

(1) Coding redundancy: Data with a greater probability to appear in a picture file can be represented by a shorter code.

(2) Interpixel redundancy: Since neighboring pixels have very high correlations, therefore, the data of a particular pixel can be derived from another.

JBIG (Joint Bi-level Image Group) is the black-and-white (BW) image compression standard set by CCITT in 1993. The method employed by the standard is to represent each pixel in a bi-level image by one bit. The complete image compression job can be achieved using a single CODEC (compression and depression) chip with the JBIG standard. As the JBIG technique is fairly mature, it has been widely used in printing and faxing.

The flowchart of the image data CODEC method in the JBIG standard is shown in FIG. 1. When the CODEC chip processes the data, all steps shown in the drawing have to be performed in each cycle T to compress or decompress each bit in the data.

First, the system performs memory access (step 10) to read data from memory. This step has to be done for either compressing or decompressing data. The accessed data are combined to form a context (CX), which is then used to look up a table and get a corresponding state (ST).

Step 20 performs look-up-table (LUT) to find the LSZ value corresponding to ST obtained in step 10. Afterwards, subtraction (A'=A−LSZ) is performed in step 30 to subtract the LSZ value obtained in step 20 from a default value A, obtaining an A' value.

Step 40 performs a selection (A=A' or A=LSZ) to determine which one to continue the subsequent operations. Afterwards, another subtraction (C'=C−A+LSZ) is performed (step 50). However, this time uses another default value C to find a new C' value by subtracting A from C, added by the LSZ value.

Afterwards, step 60 performs a C value selection (C=C' or C=C) to determine which one to use in subsequent operations. Step 70 is the renormalization to renormalize A between 0.5 and 1. Step 80 is the renormalization of C to scale it up.

Finally, step 90 performs byteout/bytein to output compressed or decompressed data to memory. This then concludes the flow of image data CODEC.

For a 100 MHz central processing unit (CPU), its work cycle is 10 ns. However, it takes about 10.5 ns to encode a single bit of the image data, from memory access (step 10) to byteout/bytein (step 90). For decoding, the circuit is more complicated and therefore the whole process takes about 11.5 ns.

In summary, we see that the time it takes for the CPU to complete either a compressing or decompressing task is longer than its work cycle. Thus, it will cause delays in image data processing and lower the printing speed of the printer.

If there is no way to reduce the time it takes to compress and decompress image data in each cycle, the printing speed will not be able to increased even when a faster CPU is used.

SUMMARY OF THE INVENTION

In view of the foregoing, an objective of the invention is to provide a method of image data compression and decompression (CODEC) for CODEC chips with the JBIG standard.

This method divides the computation method for compressing and decompressing image data into three parts: memory access, numerical calculation, renormalization and byteout/bytein. Each step takes one work cycle.

In a work cycle, the data compression and decompression of three bits can be simultaneously performed. Therefore, the CODEC speed of the whole image can be increased by at least a factor of 2. The disclosed method can be implemented in a high-speed CPU to increase the data processing speed.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
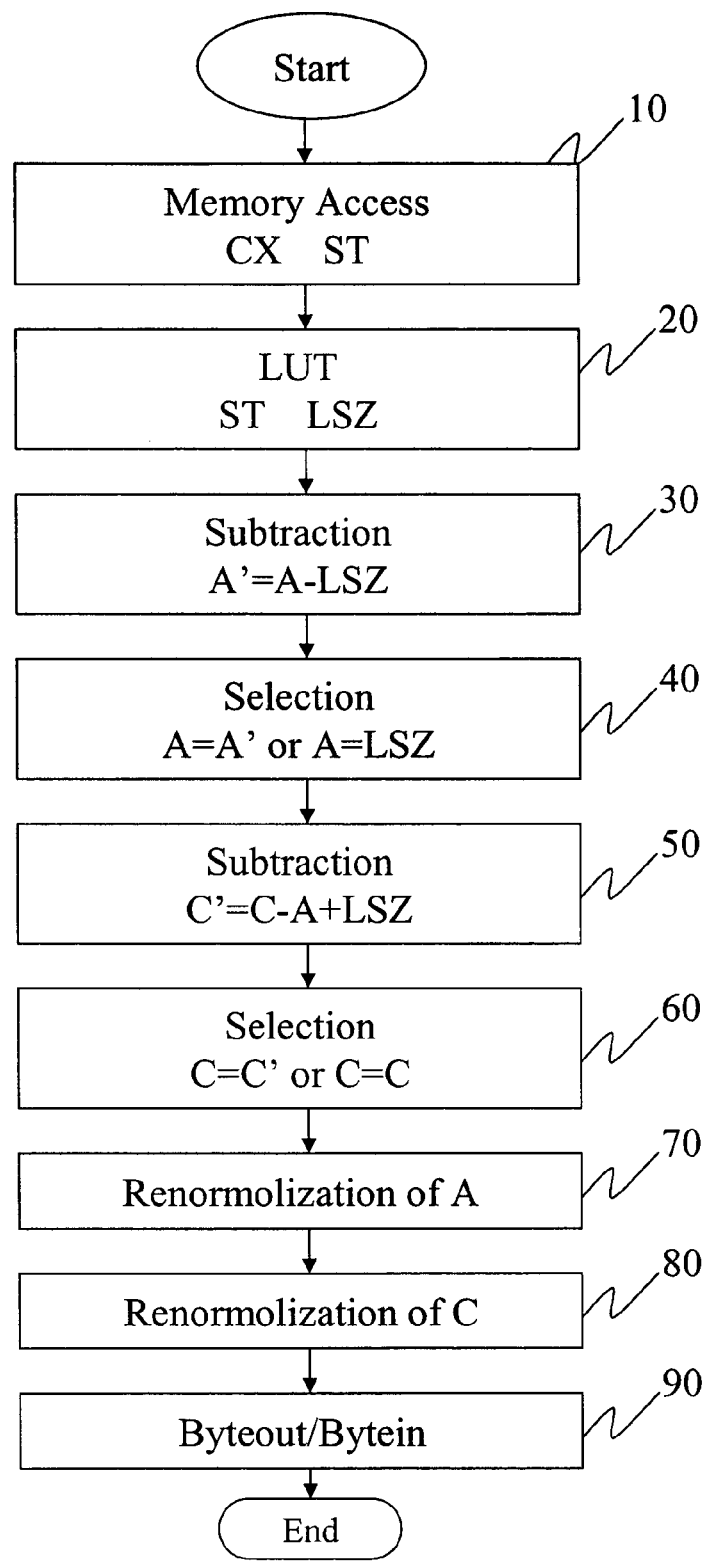
FIG. 1 is a flowchart of the computation method for image data compression and decompression with the JBIG standard in the prior art.
Figure 2:
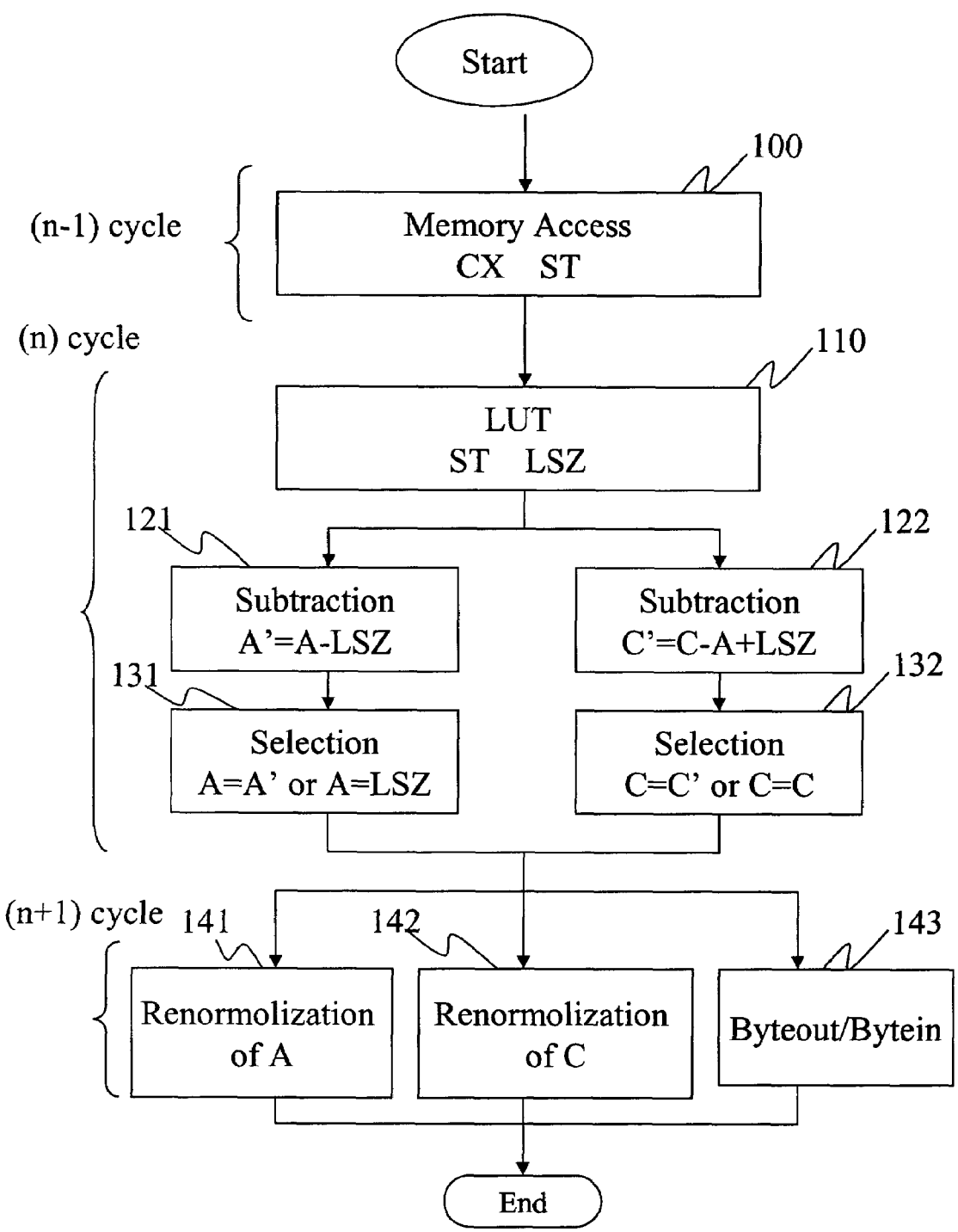
FIG. 2 is a flowchart of the disclosed method.

The disclosed image compression and decompression (CODEC) method is implemented on a CODEC chip with the JBIG standard. Its flowchart is shown in FIG. 2. The drawing shows the steps that are required to carry out when compressing or decompressing a single bit of the image data.

First, the first cycle (n−1) performs memory access (step 100). For either compressing or decompressing data, the image data have to read from memory to the CODEC chip, converting reference pixels around the pixel to be decompressed from context (CX) into state (ST).

Figure 3:
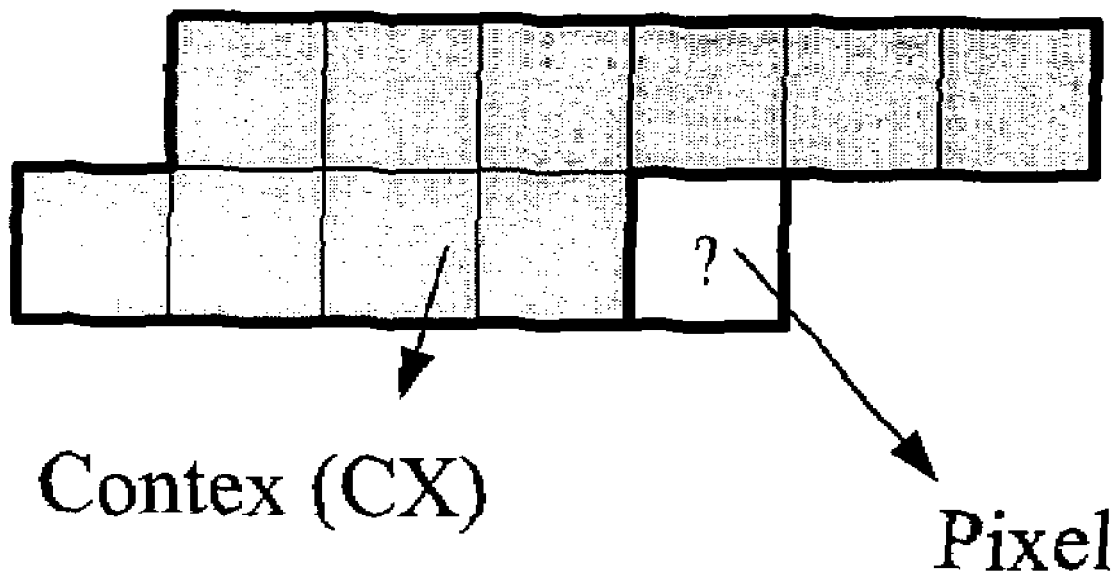
FIG. 3 is a schematic view of compressing or decompressing image data.

As shown in FIG. 3, when compressing or decompressing the image data in each pixel (white square), the surrounding pixels are taken as the reference pixels CX (gray squares).

In the second cycle n, the ST data obtained in the first cycle undergoes certain numerical operations for subsequent steps. Such numerical operations include look-up-tables (LUT's), subtractions, and selections. The ST data and more probable symbol (MPS) obtained from step 100 are used to find a corresponding LSZ value by looking up the table (step 110).

Subsequently, the system performs subtractions for two different parameters, a first default parameter A and a second default parameter C (steps 121, 122). The first default parameter A is subtracted by the LSZ value to give a first subtracted value A'=A−LSZ. The second default parameter C is subtracted with the first default parameter A and added with the LSZ value obtained by LUT (step 110) to give a second subtracted value C'=C−A+LSZ.

Afterwards, the system performs selections of two different parameters, a new first default parameter A and a new second default parameter C (steps 131, 132). The new first default parameter A is selected between the LSZ value and the first subtracted value A'. The new second default parameter C is selected between the second default parameter C and the second subtracted value C'. The new first default parameter A and new second default parameter C selected in steps 131, 132 are used to be the first default parameter A and the second default parameter C needed in the numerical operation for the next bit.

Finally, in the next cycle, the third cycle (n+1), the new first default parameter A and the new second default parameter C are renormalized (steps 141, 142). The image data processed with numerical computations and renormalization are output (step 143).

Steps 141, 142 renormalize the first default parameter A and the second default parameter C. Byteout/bytein in step 143 output compressed or decompressed image data via the JBIG-standard CODEC chip to other memory for storage.

Figure 4:
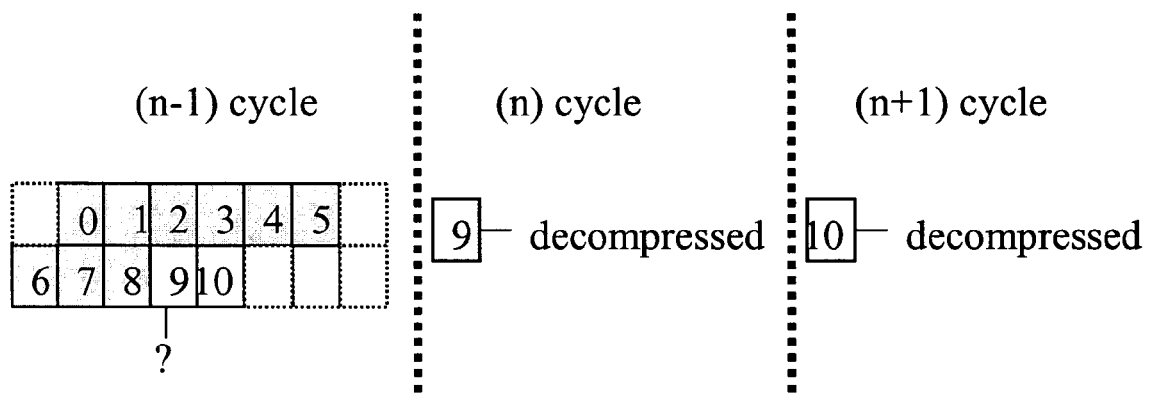
FIG. 4 is a schematic view of decompressing the tenth bit of data in an image.

Please refer to FIG. 4 for the application of the invention to the decompression of the tenth bit of image data. In the (n−1) work cycle, the ninth bit of data is not completely decompressed; therefore, the decompression of the tenth bit cannot be performed.

In this case, the ninth bit can be temporarily set as 0 or 1, with CX=0 or 1. The system can then decompress the tenth bit. In the work cycle n, the ninth bit is decompressed. Thus, the CX value for the ninth bit is known and is used to obtain the correct decompressed image data.

Figure 5:
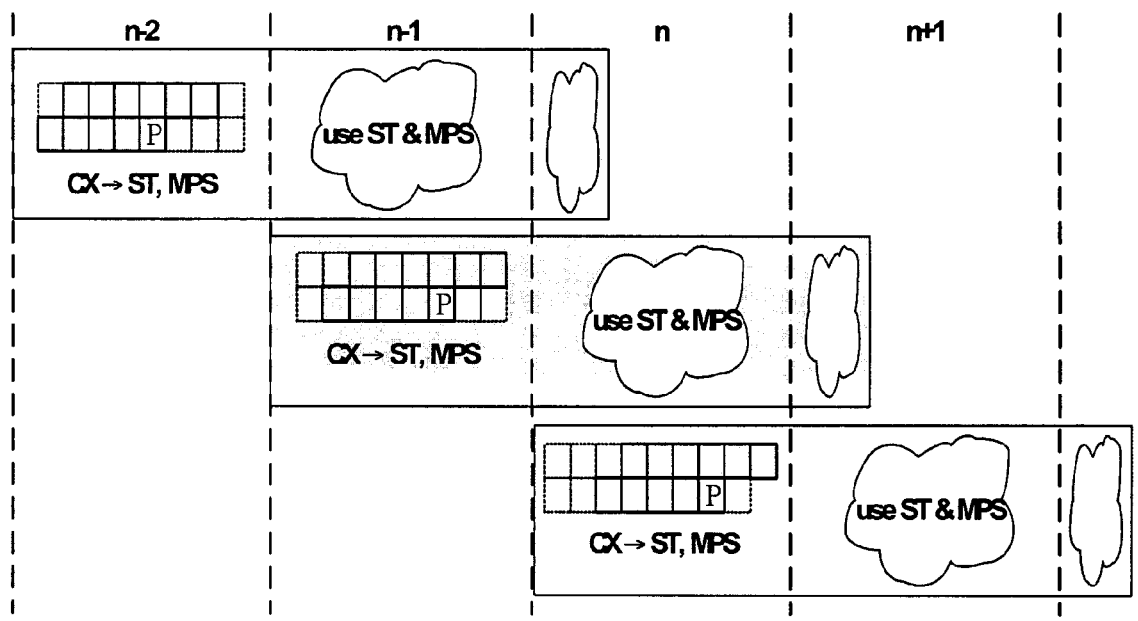
FIG. 5 is a schematic view of parallel processing three pixels at the same time in a work cycle.

With reference to FIG. 5, each work cycle simultaneously processes three pixels. In comparison, the work cycle of the prior art without pipeline improvement is longer. This method can effectively shorten the work cycle of each image data process, increasing the speed of compressing and decompressing image data.

From the data obtained from the 0.35 procedure simulation, we see that the disclosed CODEC method can effectively increase the compression and decompression speed of image data by at least a factor of 2. This method is thus applicable to high-speed CPU structures.

Certain variations would be apparent to those skilled in the art, which variations are considered within the spirit and scope of the claimed invention.

What is claimed is:

1. An image compression method using the JBIG (Joint Bi-level Image Group) image compression standards, comprising the steps of:

reading image data in a first cycle to a unitary encoder, converting a plurality of reference pixels surrounding a pixel to be decompressed from a context (CX) format to a state (ST) format;

performing with the unitary encoder a numerical operation on the image data in a second cycle, wherein the numerical operation includes the steps of:

obtaining an LSZ value using ST by look-up-table (LUT);

in parallel by software means, (i) subtracting the LSZ value from a first default parameter to obtain a first subtracted value, and selecting a new first default parameter between the LSZ value and the first subtracted value, and (ii) subtracting the first default value from a second default parameter and adding the LSZ value to it to obtain a second subtracted value, and selecting a new second default parameter between the second default parameter and the second subtracted value; and renormalizing the new first default parameter and the new second default parameter in a third cycle, and outputting the processed image data.

2. The method of claim 1, wherein the step of converting a plurality of reference pixels surrounding a pixel to be decompressed from a context (CX) format to a state (ST) format is to read image data from memory to a compression and decompression (CODEC) chip to process the image data.

3. The method of claim 1, wherein the step of reading image data in a first cycle, converting a plurality of reference pixels surrounding a pixel to be decompressed from a context (CX) format to a state (ST) format is to set the pixel before the pixel to be decompressed as one of 0 and 1 so as to obtain CX=0 or CX=1, respectively, for decompressing the image data.

4. An image compression method using the JBIG (Joint Bi-level Image Group) image compression standards, comprising the steps of:

reading image data in a first cycle to a unitary compression and decompression (CODEC) chip, in the CODEC, converting a plurality of reference pixels surrounding a pixel to be decompressed from a context (CX) format to a state (ST) format;

in the CODEC chip, performing a numerical operation on the image data in a second cycle, wherein the numerical operation includes the steps of:

obtaining an LSZ value using ST by look-up-table (LUT);

performing the following steps (i) and (ii) in parallel, (i) subtracting the LSZ value from a first default parameter to obtain a first subtracted value, and selecting a new first default parameter between the LSZ value and the first subtracted value, and (ii) subtracting the first default value from a second default parameter and adding the LSZ value to it to obtain a second subtracted value, and selecting a new second default parameter between the second default parameter and the second subtracted value; and renormalizing the new first default parameter and the new second default parameter in a third cycle, and outputting the processed image data.

* * * * *